United States Patent
Yang et al.

(10) Patent No.: US 12,200,156 B2
(45) Date of Patent: Jan. 14, 2025

(54) ELECTRONIC DEVICE

(71) Applicant: VIVO MOBILE COMMUNICATION CO., LTD., Guangdong (CN)

(72) Inventors: Pengbo Yang, Guangdong (CN); Xiaolei Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 389 days.

(21) Appl. No.: 17/675,872

(22) Filed: Feb. 18, 2022

(65) Prior Publication Data

US 2022/0174140 A1    Jun. 2, 2022

Related U.S. Application Data

(63) Continuation of application No. PCT/CN2020/111383, filed on Aug. 26, 2020.

(30) Foreign Application Priority Data

Aug. 30, 2019    (CN) .......................... 201910814969.5

(51) Int. Cl.
*H04M 1/03* (2006.01)
*H04M 1/02* (2006.01)
*H04R 1/28* (2006.01)

(52) U.S. Cl.
CPC .......... *H04M 1/035* (2013.01); *H04M 1/026* (2013.01); *H04R 1/2823* (2013.01); *H04R 2499/11* (2013.01)

(58) Field of Classification Search
None
See application file for complete search history.

(56) References Cited

U.S. PATENT DOCUMENTS

| | | |
|---|---|---|
| 10,863,293 B2 | 12/2020 | Yan et al. |
| 2004/0081329 A1 | 4/2004 | Huang et al. |
| 2012/0020508 A1* | 1/2012 | Wang .................... H04M 1/035 381/332 |
| 2012/0160599 A1 | 6/2012 | Chen |
| 2014/0153769 A1 | 6/2014 | Chen et al. |
| 2014/0177902 A1 | 6/2014 | Yeh |

(Continued)

FOREIGN PATENT DOCUMENTS

| CN | 101001480 A | 7/2007 |
|---|---|---|
| CN | 201674651 U | 12/2010 |
| CN | 201733348 U | 2/2011 |

(Continued)

OTHER PUBLICATIONS

Extended European Search Report on the European Patent Application No. 20858979.6 issued by the European Patent Office on Sep. 28, 2022.

(Continued)

*Primary Examiner* — Frantz Bataille
(74) *Attorney, Agent, or Firm* — IP & T GROUP LLP

(57) ABSTRACT

An electronic device includes a cover body, a telephone receiver, a loudspeaker, and a first cavity. The telephone receiver is accommodated in the first cavity. There is a gap between the cover body and the telephone receiver as well as between the cover body and the loudspeaker. The gap is communicated with the first cavity, and is communicated with the external environment through a sound hole of the loudspeaker.

14 Claims, 2 Drawing Sheets

(56) References Cited

U.S. PATENT DOCUMENTS

2018/0206011 A1* 7/2018 Han ................... H04R 1/2842

FOREIGN PATENT DOCUMENTS

| | | |
|---|---|---|
| CN | 102340710 A | 2/2012 |
| CN | 104219608 A | 12/2014 |
| CN | 205081822 U | 3/2016 |
| CN | 105828260 A | 8/2016 |
| CN | 106170029 A | 11/2016 |
| CN | 106254592 A | 12/2016 |
| CN | 205812376 U | 12/2016 |
| CN | 206042080 U | 3/2017 |
| CN | 208940020 U | 6/2019 |
| CN | 110602606 A | 12/2019 |
| EP | 3503510 A1 | 6/2019 |
| JP | 2018-056721 A | 4/2018 |
| WO | 2018214714 A1 | 11/2018 |

OTHER PUBLICATIONS

The First Office Action of Priority Application No. CN 201910814969.5 issued by the Chinese Patent Office on Sep. 30, 2020.
International Search Report and Written Opinion of International Application No. PCT/CN2020/111383 issued by the Chinese Patent Office on Dec. 1, 2020.

* cited by examiner

ELECTRONIC DEVICE

CROSS-REFERENCE TO RELATED APPLICATIONS

This application is a Bypass Continuation Application of PCT/CN2020/111383 filed on Aug. 26, 2020, which claims priority to Chinese Patent Application No. 201910814969.5 filed on Aug. 30, 2019, which are incorporated herein by reference in their entirety.

TECHNICAL FIELD

The present disclosure relates to the field of communications technologies, and in particular, to an electronic device.

BACKGROUND

With the rapid development of electronic devices, sealing performance of electronic devices becomes increasingly good. In actual use, there is generally a gap between a cover body and a telephone receiver. The gap becomes smaller when external pressure is exerted on the cover body, which leads to a sharp change in air pressure of the telephone receiver. As a result, the air pressure of the telephone receiver is unbalanced. Further, sound produced by the telephone receiver includes noise. It can be learned that the sound effect of the current telephone receiver is relatively poor.

SUMMARY

Embodiments of the present disclosure provide an electronic device.

Embodiments of the present disclosure provide an electronic device, including a cover body, a telephone receiver, a loudspeaker, and a first cavity, where the telephone receiver is accommodated in the first cavity, there is a gap between the cover body and the telephone receiver as well as between the cover body and the loudspeaker, and the gap is communicated with the first cavity, and is communicated with the external environment through a sound hole of the loudspeaker.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of this disclosure shall fall within the protection scope of this disclosure.

Figure 1:
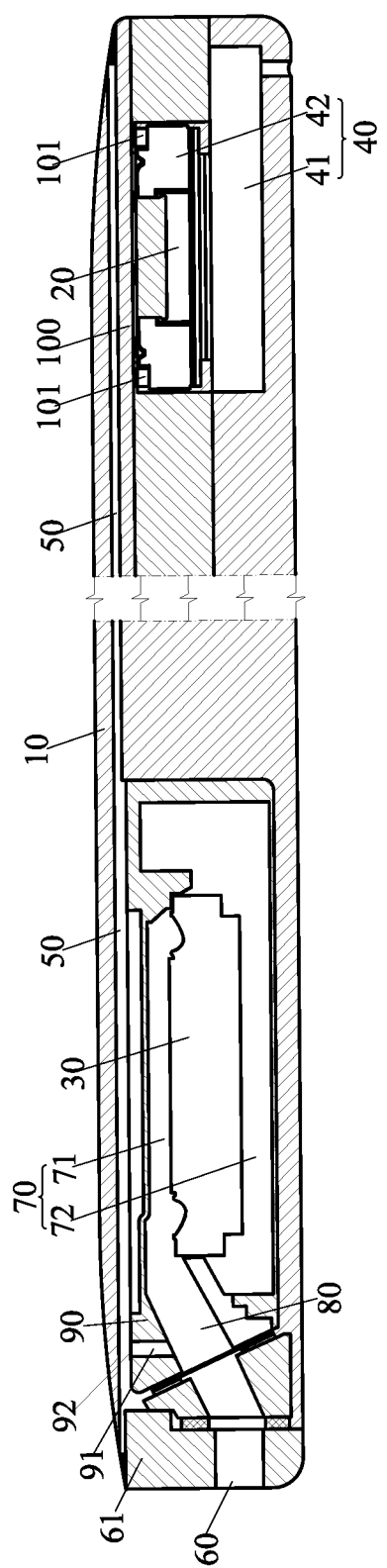
FIG. 1 is a schematic structural diagram of an electronic device according to an embodiment of the present disclosure.

Referring to FIG. 1, FIG. 1 is a schematic structural diagram of an electronic device according to an embodiment of the present disclosure. As shown in FIG. 1, the electronic device includes a cover body 10, a telephone receiver 20, a loudspeaker 30, and a first cavity 40, where the telephone receiver 20 is accommodated in the first cavity 40, there is a gap 50 between the cover body 10 and the telephone receiver 20 as well as between the cover body 10 and the loudspeaker 30, and the gap 50 is communicated with the first cavity 40, and is communicated with the external environment through a sound hole 60 of the loudspeaker 30.

The telephone receiver 20 and the loudspeaker 30 may be disposed on different side surfaces of the electronic device. For example, the telephone receiver 20 and the loudspeaker 30 may be respectively disposed on a first side surface and a second side surface of the electronic device that are opposite.

As shown in FIG. 1, when the telephone receiver 20 is accommodated in the first cavity 40, the telephone receiver 20 may be abutted on an inner wall of the first cavity 40, thereby separating the first cavity 40 into two cavity bodies. The two cavity bodies may be respectively referred to as a front cavity and a back cavity of the telephone receiver 20 (namely a telephone receiver front cavity and a telephone receiver back cavity).

The first cavity 40 may be in direct communicated with the gap 50. Certainly, a baffle may be disposed between the first cavity 40 and the gap 50. A through hole may be formed on the baffle. The through hole may be communicated with the first cavity 40 and the gap 50. In this way, the baffle can achieve a water-proof and dust-proof effect.

A width of the gap 50 is not limited herein. It should be noted that, the gap 50 with a narrower width has a better effect. In this way, a thickness of the entire electronic device can be reduced. In addition, there is a gap 50 between the cover body 10 and the telephone receiver 20 as well as between the cover body 10 and the loudspeaker 30 may be: there is a first gap between the cover body 10 and the telephone receiver 20; there may be a second gap between the cover body 10 and the loudspeaker 30; and the first gap and the second gap form the gap 50. It should be noted that, the first gap may be communicated with the second gap. Widths of the first gap and the second gap may be the same as or different from each other. This is not specifically limited herein.

A quantity of the sound hole 60 is not limited herein. Generally, the electronic device includes a plurality of sound holes 60. All intervals between adjacent sound holes 60 of the plurality of sound holes 60 may be the same. Certainly, all apertures of the sound holes 60 may be the same. The sound holes 60 are communicated with the external environment. In this way, sound generated by the loudspeaker 30 may be transmitted to the external environment through the sound holes 60, which reduces loss of the sound generated by the loudspeaker 30 in a transmission process. Therefore, the sound generation effect of the loudspeaker 30 is relatively good.

In this embodiment of the present disclosure, the electronic device includes a cover body 10, a telephone receiver 20, a loudspeaker 30, and a first cavity 40. The telephone receiver 20 is accommodated in the first cavity 40. There is a gap 50 between the cover body 10 and the telephone receiver 20 as well as between the cover body 10 and the loudspeaker 30. The gap 50 is communicated with the first cavity 40, may be communicated with the first cavity 40 though an air vent, and is communicated with the external environment through a sound hole 60 of the loudspeaker 30. In this way, the first cavity 40 can keep communicated with the external environment through the gap 50 and the sound hole 60. When external force is exerted on the cover body 10 (the external force F shown in FIG. 2), air pressure in the first cavity 40 may always keep balanced (that is, air pressure in the telephone receiver 20 may also keep balanced), which reduces noise included in sound generated by the telephone receiver 20. Therefore, the sound generation effect of the telephone receiver 20 and user's experience are improved.

Figure 2:
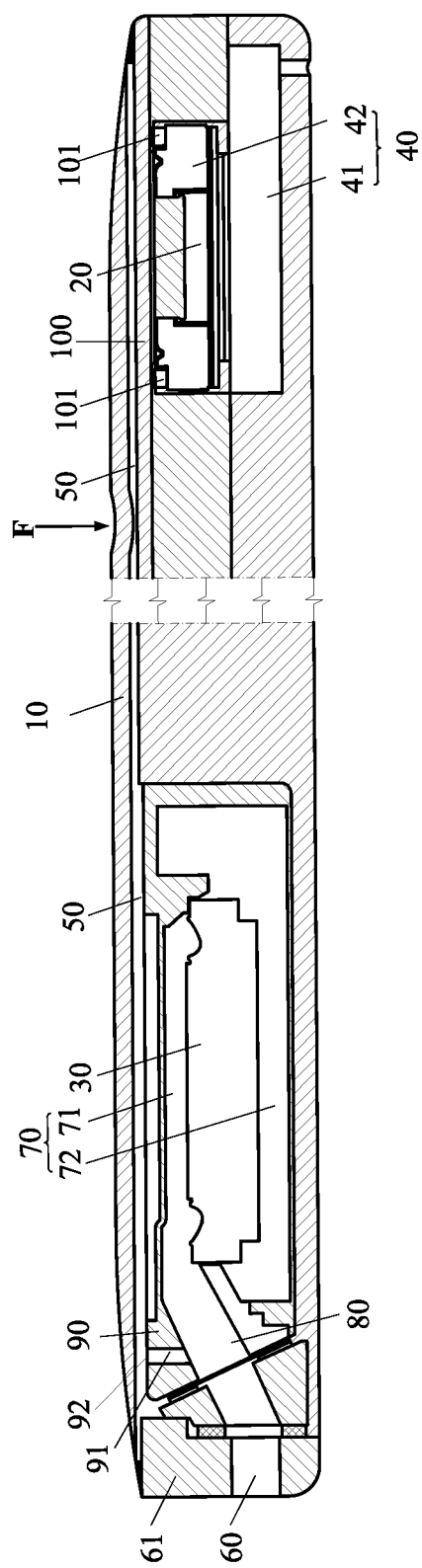
FIG. 2 is a schematic structural diagram of another electronic device according to an embodiment of the present disclosure.

Optionally, referring to FIG. 1 and FIG. 2, the electronic device further includes a second cavity 70 and a sound channel 80. The loudspeaker 30 is accommodated in the second cavity 70. The second cavity 70 is communicated with the gap 50. The second cavity 70 is communicated with the sound hole 60 through the sound channel 80.

When the loudspeaker 30 is accommodated in the second cavity 70, the loudspeaker 30 may be abutted on an inner wall of the second cavity 70, thereby separating the second cavity 70 into two cavity bodies. The two cavity bodies may be respectively referred to as a front cavity and a back cavity of the loudspeaker 30 (namely a loudspeaker front cavity and a loudspeaker back cavity).

In this embodiment of the present disclosure, because the second cavity 70 is communicated with the sound hole 60 through the sound channel 80, and the loudspeaker 30 is accommodated in the second cavity 70, sound generated by the loudspeaker 30 can diffuse to the external environment through the sound channel 80 and the sound hole 60. Because loss of the sound is relatively small during transmission in the sound channel 80 and the sound hole 60, the transmission effect of the sound is relatively good.

Optionally, a first side wall 90 is disposed between the second cavity 70 and the gap 50, a first air vent 91 is formed on the first side wall 90, and the first air vent 91 is disposed corresponding to the sound channel 80 or the second cavity 70.

Both a thickness of the first side wall 90 and an aperture of the first air vent 91 are not limited herein.

In addition, one end of the first air vent 91 may be communicated with the gap 50, and the other end of the first air vent 91 may be communicated with the sound channel 80 or the second cavity 70.

In this embodiment of the present disclosure, a first side wall 90 is disposed between the second cavity 70 and the gap 50. In this case, the water-proof and dust-proof effect of the waterproof electronic device can be enhanced. In addition, because the first air vent 91 is formed on the first side wall 90, the gap 50 can be communicated with the second cavity 70. In addition, a machining process of the first air vent 91 is simple, which reduces a machining cost.

Optionally, the second cavity 70 includes a loudspeaker front cavity 71 and a loudspeaker back cavity 72. The loudspeaker front cavity 71 is communicated with the sound channel 80. The first air vent 91 is communicated with the gap 50 and the loudspeaker front cavity 71 respectively.

The loudspeaker 30 may include a vibrating diaphragm, a single body, and a speaker. The vibrating diaphragm of the loudspeaker 30 may be disposed in the loudspeaker front cavity 71, facing the first side wall 90. The speaker may be disposed corresponding to the vibrating diaphragm. The single body may be disposed on one side of the speaker. In addition, the single body may be disposed in the loudspeaker back cavity 72. The speaker is configured to separate the loudspeaker front cavity 71 from the loudspeaker back cavity 72. The first air vent 91 may be communicated with the loudspeaker front cavity 71 and the gap 50 respectively.

In this embodiment of the present disclosure, the second cavity 70 includes the loudspeaker front cavity 71 and the loudspeaker back cavity 72, and the loudspeaker front cavity 71 is communicated with the sound channel 80. Therefore, sound generated by the loudspeaker 30 may be transmitted to the external environment through the loudspeaker front cavity 71, the sound channel 80, and the sound hole 60. Because loss of the sound in the loudspeaker front cavity 71 and the sound channel 80 is relatively small, the transmission effect of the sound is relatively good.

Optionally, the second cavity 70 includes a loudspeaker front cavity 71 and a loudspeaker back cavity 72. The loudspeaker front cavity 71 is communicated with the sound channel 80. The first air vent 91 is communicated with the gap 50 and the sound channel 80 respectively.

The loudspeaker 30 may include a vibrating diaphragm, a single body, and a speaker. For details, refer to the foregoing embodiment.

In this embodiment of the present disclosure, because the vibrating diaphragm of the loudspeaker 30 is disposed in the loudspeaker front cavity 71, and the first air vent 91 is communicated with the gap 50 and the sound channel 80 respectively, that is, the first air vent 91 is disposed directly corresponding to the sound channel 80, but not corresponding to the vibrating diaphragm of the loudspeaker 30, an impact on performance of the vibrating diaphragm of the loudspeaker 30 is avoided. Therefore, the sound generation effect of the loudspeaker 30 is relatively good.

Optionally, the electronic device further includes a middle frame 61; and the sound hole 60 is formed on the middle frame 61.

A position of the sound hole 60 in the middle frame 61 is not limited herein.

In addition, there may also be a gap between the middle frame 61 and the telephone receiver 20 as well as between the middle frame 61 and the loudspeaker 30. This gap may be a part of the gap 50.

In this embodiment of the present disclosure, because the sound hole 60 is formed on the middle frame 61, not only can the sound hole 60 be better communicated with the external environment to ensure the sound effect, but also a weight of the entire electronic device is reduced.

Optionally, referring to FIG. 1 and FIG. 2, the sound channel 80 is disposed obliquely relative to the cover body 10.

A first end of the sound channel 80 is communicated with the loudspeaker front cavity 71; and a second end of the sound channel 80 is communicated with the sound hole 60. The first end of the sound channel 80 may be disposed near the cover body 10; and the second end of the sound channel 80 may be disposed away from the cover body 10.

In this embodiment of the present disclosure, the sound channel 80 is disposed obliquely relative to the cover body 10, which can reduce a phenomenon that water flows back into the loudspeaker front cavity 71 through the sound hole 60 and the sound channel 80, thereby enhancing the waterproof effect of the electronic device.

Optionally, referring to FIG. 1 and FIG. 2, a waterproof and breathable film 92 is also disposed in the first air vent 91.

The waterproof and breathable film 92 may be a polymer water-proof material, and may be made of polytetrafluoroethylene resin via processes such as stretching. Liquid can be prevented from passing through the waterproof and breathable film 92 on the premise that gas can pass through the waterproof and breathable film 92.

In this embodiment of the present disclosure, because a waterproof and breathable film 92 is also disposed in the first air vent 91, liquids such as water can be prevented from entering, via the first air vent 91, the electronic device including devices such as a mainboard, thereby further enhancing the water-proof effect of the electronic device.

Optionally, referring to FIG. 1 and FIG. 2, the waterproof and breathable film 92 is disposed at one end, near the gap 50, of the first air vent 91.

In this embodiment of the present disclosure, the waterproof and breathable film 92 is disposed at the end, near the gap 50, of the first air vent 91. In this way, in an assembly process, the waterproof and breathable film 92 can be directly assembled at the end, near the gap 50, of the first air vent 91. Compared with a method in which the waterproof and breathable film 92 is assembled in the first air vent 91, this assembling manner is relatively simple, the assembling efficiency is higher, and subsequent maintenance or replacement is more convenient.

Optionally, a plurality of first air vents 91 are formed on the first side wall 90.

Apertures of the plurality of first air vents 91 may be the same as or different from one another. Optionally, the apertures of the plurality of first air vents 91 are the same as each other. In this way, machining is more convenient.

In addition, because the plurality of first air vents 91 are disposed at different positions of the first side wall 90, and thicknesses at the different positions of the first side wall 90 may be different from one another, thicknesses of the first air vents 91 may also be different from another.

In this embodiment of the present disclosure, because the plurality of first air vents 91 are disposed in the first side wall 90, compared with a method in which only one first air vent 91 is disposed, when one first air vent 91 is blocked, gas can pass through the gap 50 and the second cavity 70 via another first air vent 91, which improves the ventilation stability.

Optionally, the plurality of first air vents 91 are arranged at equal intervals.

That the plurality of first air vents 91 are formed at equal intervals may be: all intervals between adjacent first air vents 91 are the same.

In this embodiment of the present disclosure, because the plurality of first air vents 91 are arranged at equal intervals, the effect of ventilation between the gap 50 and the second cavity 70 may be relatively uniform.

Optionally, referring to FIG. 1 and FIG. 2, a second side wall 100 is disposed between the first cavity 40 and the gap 50; a second air vent 101 is formed on the second side wall 100; and the second air vent 101 is communicated with the gap 50 and the first cavity 40 respectively.

In this embodiment of the present disclosure, because the second air vent 101 is formed on the second side wall 100, the first cavity 40 can be communicated with the gap 50 through the second air vent 101, and be communicated with the external environment through the gap 50, the first air vent 91, and the sound hole 60. Therefore, air pressure in the first cavity 40 can always keep balanced, which reduces noise included in sound generated by the telephone receiver 20, thereby improving the sound generation effect of the telephone receiver 20.

Optionally, the first cavity 40 includes a telephone receiver front cavity 41 and a telephone receiver back cavity 42, and the second air vent 101 is communicated with the telephone receiver back cavity 42.

Both the single body and the vibrating diaphragm of the telephone receiver 20 may be disposed in the telephone receiver front cavity 41.

In this embodiment of the present disclosure, that the second air vent 101 is communicated with the telephone receiver back cavity 42 may be considered as that the entire gap 50 is a part of a back cavity of the telephone receiver 20, thereby enlarging space in the back cavity of the telephone receiver 20.

Optionally, referring to FIG. 1 and FIG. 2, two second air vents 101 are formed on the second side wall 100. The two second air vents 101 are respectively disposed on two opposite lateral edges of the second side wall 100.

The telephone receiver 20 may be disposed corresponding to a central position of the second side wall 100.

In addition, thicknesses and apertures of the two second air vents 101 are not limited herein. When thicknesses of the second side wall 100 are equal, the thicknesses of the two second air vents 101 are equal. Optionally, the apertures of the two second air vents 101 may also be equal.

In this embodiment of the present disclosure, because the two second air vents 101 are formed on the second side wall 100, compared with a method in which only one second air vent 101 is formed on the second side wall 100, when one second air vent 101 is blocked, gas can pass through the gap 50 and the first cavity 40 via another second air vent 101, which improves the ventilation stability. In addition, because the two second air vents 101 are respectively formed on two opposite lateral edges of the second side wall 100, the effect of ventilation between the gap 50 and the first cavity 40 may be more uniform.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. An electronic device, comprising: a cover body, a telephone receiver, a loudspeaker, and a first cavity, wherein the telephone receiver is accommodated in the first cavity, there is a gap between the cover body and the telephone receiver as well as between the cover body and the loudspeaker, and the gap is communicated with the first cavity, and is communicated with the external environment through a sound hole of the loudspeaker; and the electronic device further comprises: a second cavity and a sound channel, wherein the loudspeaker is accommodated in the second cavity, the second cavity is communicated with the gap, and the second cavity is communicated with the sound hole through the sound channel.

2. The electronic device according to claim 1, wherein a first side wall is disposed between the second cavity and the gap, a first air vent is formed on the first side wall, and the first air vent is disposed corresponding to the sound channel or the second cavity.

3. The electronic device according to claim 2, wherein the second cavity comprises a loudspeaker front cavity and a loudspeaker back cavity, the loudspeaker front cavity is communicated with the sound channel, and the first air vent is communicated with the gap and the loudspeaker front cavity respectively.

4. The electronic device according to claim 2, wherein the second cavity comprises a loudspeaker front cavity and a loudspeaker back cavity, the loudspeaker front cavity is communicated with the sound channel, and the first air vent is communicated with the gap and the sound channel respectively.

5. The electronic device according to claim 1, further comprising a middle frame, wherein the sound hole is formed on the middle frame.

6. The electronic device according to claim 2, wherein a plurality of first air vents are formed on the first side wall.

7. The electronic device according to claim 6, wherein the plurality of first air vents are arranged at equal intervals.

8. The electronic device according to claim 1, wherein a second side wall is disposed between the first cavity and the gap, a second air vent is formed on the second side wall, and the second air vent is communicated with the gap and the first cavity respectively.

9. The electronic device according to claim 8, wherein the first cavity comprises a telephone receiver front cavity and a telephone receiver back cavity, and the second air vent is communicated with the telephone receiver back cavity.

10. The electronic device according to claim 8, wherein two second air vents are formed on the second side wall, the two second air vents are respectively disposed on two opposite lateral edges of the second side wall.

11. The electronic device according to claim 10, wherein the telephone receiver is disposed corresponding to a central position of the second side wall.

12. The electronic device according to claim 1, wherein the gap comprises a first gap and a second gap; and
there is the first gap between the cover body and the telephone receiver; there is the second gap between the cover body and the loudspeaker.

13. The electronic device according to claim 2, wherein a waterproof and breathable film is disposed in the first air vent.

14. The electronic device according to claim 13, wherein the waterproof and breathable film is disposed at one end, near the gap, of the first air vent.

* * * * *